Sept. 4, 1928.
V. B. DAWSON ET AL
1,682,956
GRIPPING AND PULLING IMPLEMENT
Filed Nov. 10, 1926
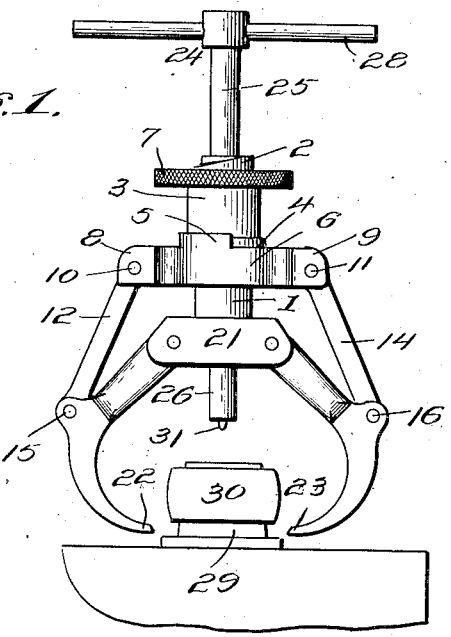
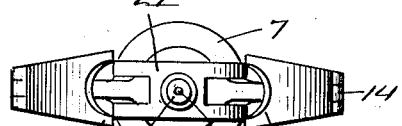
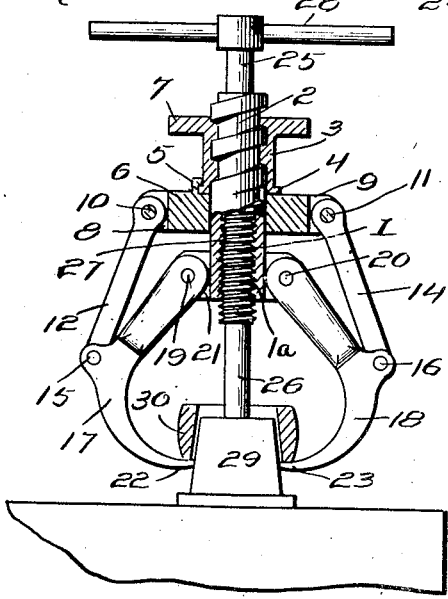
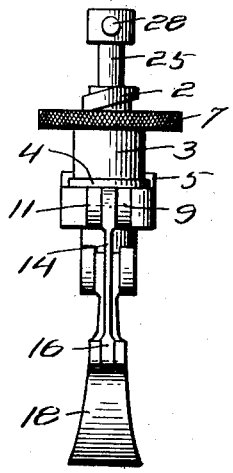
Inventor
Vernon B. Dawson
Ivan B. Penton.
By John C. Brady
Attorney Patented Sept. 4, 1928.

1,682,956

UNITED STATES PATENT OFFICE.

VERNON B. DAWSON AND IVAN B. PENTON, OF WILMINGTON, DELAWARE.

GRIPPING AND PULLING IMPLEMENT.

Application filed November 10, 1926. Serial No. 147,510.

This invention relates to hand tools and more particularly to a gripping and pulling implement for use in manually removing an obstruction.

One of the objects of our invention is to provide a gripping and pulling tool of simple construction which may be inexpensively manufactured to effectively grip and pull an obstruction without the expenditure of any considerable effort on the part of the operator.

Another object of our invention is to provide a quick acting gripping device for a hand tool with a screw device associated therewith for causing relative movement between the gripping device and the obstruction for positively removing the obstruction.

Still another object of our invention is to provide a hand tool with a body portion having gripping jaws pivotally mounted thereon and a pair of concentric screws with means engaging one of the screws for controlling the opening and closing of the gripping jaws, while the other of said screws may be operated to enable the jaws to pull an obstruction.

A still further object of our invention is to provide a compact gripping and pulling tool in which a pair of gripping jaws are employed linked with an adjustable screw device for controlling the rapid opening and closing thereof in cooperation with a longitudinally movable central screw member which enables the jaws to pull the obstruction.

Our invention defines particular application as a storage battery tool where difficulty is often experienced in removing terminals from the storage battery due to heavy corrosion which collects around such terminals.

Our invention has been found to be practical in construction and capable of efficient operation as a storage battery tool but although the invention is described as applied to a storage battery tool we desire that it be understood that the tool may be employed for many other purposes and that we do not intend to limit the application of our invention to storage battery tools.

The invention will be more clearly understood by reference to the following specification and the accompanying drawings, in which drawings:

Fig. 1 is a front elevation showing the hand tool with the gripping jaws in position about to grip a storage battery terminal which has become corroded upon the battery; Fig. 2 is a front elevation of the tool partially in cross section showing the gripping jaws in closed position under the storage battery terminal with the terminal being gradually raised from the storage battery; Fig. 3 is a plan view looking beneath the hand tool with the gripping jaws partially opened; and Fig. 4 is a side view of the gripping and pulling tool.

Referring to the drawings in detail, the hand tool comprises a cylindrical body portion 1 which contains at its upper end spiral square threads 2 of relatively large pitch. The bore within the threaded portion 2 is provided with straight cylindrical sides, while the lower portion of the body 1 is internally screw threaded as represented at $1^a$. A rotatable screw threaded member 3 is provided which engages the screw threads 2 on the upper portion of body 1 and which may be rotated with respect to the body 1. A flange 4 is provided on the lower portion of the rotatable screw threaded member 3 and is arranged to engage a semicircular skirt portion 5 upon a laterally extending member 6. A hand grip 7 is provided on the rotatable screw threaded member 3 which enables the said member to be raised or lowered on the screw threads 2 to elevate or lower the laterally projecting member 6. The member 6 is provided with journals 8 and 9 at opposite ends thereof in which are pivoted at 10 and 11 respectively short links 12 and 14. The other ends of links 12 and 14 are pivotally connected as represented at 15 and 16 to the gripping jaws 17 and 18. The gripping jaws 17 and 18 are pivoted at 19 and 20 in journals on opposite ends of block 21 which is secured to the lower extremity of the cylindrical body portion 1. The gripping jaws have faces 22 and 23 directed toward each other. The opening and closing of these faces is controlled by the rotatable movement of the quick acting screw member 3 together with links 12 and 14 which brings into effect a force which tends to open and close the jaws with great rapidity.

The pulling portion of the tool comprises a longitudinally extending rod 24 having a plain cylindrical portion at each end thereof as represented at 25 and 26 and the intermediate threaded portion 27 the threads of which cooperate with the internal screw threads 1ᵃ in the body portion 1. The upper extremity of the longitudinally extending rod 24 is provided with a hand grip 28 which enables the rod 24 to be quickly lowered or elevated on the body portion 1.

The operation of our hand tool will be understood from the preceding description. It may be said however by way of example that the jaws 17 and 18 may be operated to their maximum distance by rotating the hand grip 7 of the rotatable screw threaded member 3 to its next position on the spiral screw threads 2. The longitudinal rod 24 is elevated from a position adjacent the jaws by counter-clockwise rotation of the hand device 28. The tool is then lowered over the lug or obstruction or storage battery post represented at 29. Lug 30 is removed from the post 29 by quickly revolving the rotatable screw member 3 in a clockwise direction whereby the gripping jaws 22 and 23 assume the position shown in Figure 2 of the drawings. Rod 24 is then lowered in position by rotating the hand device 28 in a clockwise direction whereby the center 31 engages the top of post 29. Continued rotation of the hand device 28 causes the faces 22 and 23 to be drawn upward and thereby operated to produce relative movement between lug 30 and the post 29 in pulling the corroded terminal from the storage battery.

The body portion 1 is substantially T shaped, that is to say, the end of the cylindrical body portion terminates in the laterally extending member 21 forming the top of the T in the extremities of which the gripping jaws 17 and 18 are pivoted. The T-shaped member is substantially smooth over one part of its cylindrical length on the exterior thereof but is screw threaded over the upper extremity thereof as represesnted at 2 in the drawings.

It will be appreciated that our implement may be used for many different purposes and as we have hereinbefore stated we intend no limitations upon the invention other than that imposed by the scope of the appended claims.

What we claim and desire to secure by Letters Patent of the United States is as follows:

1. A gripping and pulling tool comprising a cylindrical body portion screw threaded on the upper extremity of the exterior surface thereof, journals on opposite sides of the lower portion of said body portion, gripping jaws pivoted in said journals, a rotatable screw threaded device operable upon said screw threaded portion, a laterally extending member adapted to be reciprocated upon said body portion of said rotatable screw threaded device, links connecting the opposite sides of said last mentioned member and said gripping jaws whereby said jaws may be quickly opened and closed, and screw threaded means extending centrally through said body portion for laterally moving said jaws with respect to a fixed point.

2. A hand gripping and pulling tool comprising in combination a cylindrical body portion screw threaded on the exterior upper extremity thereof and having a laterally extending member on one end thereof, journals in each side of said member, pivoted gripping jaws in said journals, a laterally extending member adapted to be reciprocated with respect to said first mentioned laterally extending member, links interconnecting said jaws with said second mentioned laterally extending member whereby said jaws may be opened or closed for gripping an object, and means extending through said body portion for causing relative movement between said jaws and said object.

3. A hand gripping and pulling tool comprising in combination a substantially T-shaped member having a vertically extending screw threaded cylindrical portion, a laterally extending member adapted to be raised or lowered with respect to the screw threaded cylindrical portion, a pair of jaws pivoted in the lower portion of said T-shaped member, links interconnecting said jaws and said laterally extending member, means rotatable with respect to said screw threaded cylindrical portion for moving said laterally extending member toward and away from said T-shaped portion whereby said jaws may be opened and closed to grip an object, and a centrally disposed screw threaded member adapted to cause said jaws to move with respect to said object.

VERNON B. DAWSON.
IVAN B. PENTON.